United States Patent [19]

Halm

[11] Patent Number: 4,592,258
[45] Date of Patent: Jun. 3, 1986

[54] MANIPULATING DEVICE FOR PERFORMING REMOTELY-CONTROLLED WORK WITH A TOOL

[75] Inventor: Horst Halm, Dortmund, Fed. Rep. of Germany

[73] Assignee: Deutsche Gesellschaft für Wiederaufarbeitung von Kernbrennstoffen mbH, Hanover, Fed. Rep. of Germany

[21] Appl. No.: 580,514

[22] Filed: Feb. 15, 1984

[30] Foreign Application Priority Data

Mar. 3, 1983 [DE] Fed. Rep. of Germany ....... 3307456

[51] Int. Cl.[4] .................. B25B 29/00; B23B 47/00
[52] U.S. Cl. ..................................... 81/57.4; 408/234
[58] Field of Search .................. 81/57.4, 57.41; 51/99; 408/234, 236, 237

[56] References Cited

U.S. PATENT DOCUMENTS

| 1,058,654 | 4/1913 | Barber | 81/57.4 |
| 3,417,949 | 12/1968 | Waber | 408/234 X |
| 4,478,111 | 10/1984 | Wells et al. | 81/57.4 X |
| 4,492,059 | 1/1985 | Panetti | 51/99 X |

Primary Examiner—James G. Smith
Attorney, Agent, or Firm—Walter Ottesen

[57] ABSTRACT

The invention is directed to a manipulating device for remotely-controlled manipulation of tools such as an impact wrench or the like. The device includes a support structure for the tool and suspension means for engaging a load hook of a crane pulley or a power manipulator. The support structure includes two side pieces arranged parallel with one another and fixed laterally to the tool. The side pieces contain longitudinally extending slots which connect the end locations which correspond to the horizontal and vertical working positions of the composite assembly made up of the tool and support. The suspension means includes a carrying yoke which can be displaced relative to the support structure. The yoke is guided at its lower end in the longitudinally extending slots. The manipulating device can be moved between its horizontal and vertical working positions without the need for any additional mechanical holding or moving components.

5 Claims, 6 Drawing Figures

MANIPULATING DEVICE FOR PERFORMING REMOTELY-CONTROLLED WORK WITH A TOOL

BACKGROUND OF THE INVENTION

Installations for reprocessing spent nuclear fuel include large, so-called hot-cells to receive the materials for processing. In these large cells, which provide a shield from radiation, processing components are arranged in scaffolds or racks.

Maintenance work within the large irradiated cell must as far as possible be carried out without the need for personnel to enter the cell. Maintenance work is therefore done by movable remote handling machines.

Remotely-controlled impact wrenches moved by a crane or a power manipulator are used to release and make threaded connections in predetermined positions.

It is known to clamp these impact wrenches in a support with two suspension lugs fixed thereto. Depending on the hold of the crane hook or power manipulator, the tool is directed to the working area hanging in a vertical or horizontal position. Changing from the horizontal to the vertical position is laborious and time consuming. The power manipulator or crane travels with the tool to a depositing station, where the tool is set down and the load hook unhooked from one suspension lug. The load hook is thereupon hooked into the other lug, and the power manipulator or crane travels back to the place of use.

When changing over to a different working position, the apparatus has to be unhooked and fitted back in the other suspension lug. During the re-suspending or re-engaging operation, there is a danger that the holding device with the tool may drop down or slip out of the hook and could then be recovered only with considerable difficulty.

In DE-GM 81 30 849, it is suggested that the working position be changed more quickly by rotatably fixing the support to the suspension means by a pin. The center of gravity common to the tool and the support is in front of the axis of rotation of the pin, as seen in the working direction. The support carries a plate with a catch mounted rotatably thereon in a bearing bolt. The catch is pressed alternately against two stops by a compression spring. The suspension means includes a side plate with abutment pegs and two cams arranged thereon in a sector of a circle.

The disadvantage of this apparatus is that it has a large number of movable parts. The apparatus itself requires maintenance and repair.

SUMMARY OF THE INVENTION

It is an object of the invention to provide a device of the type described above wherein the manipulating device requires a smaller technical outlay and a rapid change can be made from the horizontal to the vertical operating position.

The manipulating device of the invention is for use in performing remotely-controlled work with a tool such as an impact wrench or the like. The manipulating device is supported from support means such as the loading hook of a crane pulley or a power-driven manipulator or the like.

According to a feature of the device of the invention, the tool is clamped and fixed between two parallel side plates of a frame structure. The side plates contain guide means in the form, for example, of longitudinally extending slots with end locations corresponding to the horizontal and vertical work positions of the tool. The frame structure and the tool are a composite assembly and have a common center of gravity. More specifically, the guide means formed in each of the side plates connects a first end location to a second end location. The first end location lies in a first reference plane passing through the common center of gravity and the second end location lies in a second reference plane also passing through the common center of gravity.

A carrying yoke is connected to the support means and slidably and pivotally engages the slots so as to permit movement of the yoke between the first end location whereat the composite assembly is held so that the tool is in a horizontal operating position and the second end location whereat the composite assembly is held so that the tool is in a vertical operating position.

The carrying yoke is pivotably and displaceably mounted in these longitudinally extending slots by means of a guiding pin. The yoke is fixed to a flange of the crane pulley or is held with a normal load hook. The lower end of the yoke can travel freely from one end location to the other within the inclined longitudinally extending slots.

When the impact wrench is in the horizontal working position, the guided end of the yoke is in the first end location. If the composite assembly has to be changed from the horizontal to the vertical working position, the device is placed on any surface by a crane, and the yoke is shifted relative to the frame structure by moving the crane pulley. An ensuing lifting movement of the crane causes the guided end of the yoke to slide into the second end location of the longitudinally extending slots for the vertical working position.

In order to change from the vertical to the horizontal working position, the impact wrench together with the frame structure is placed with the tip of the wrench on any surface by the crane. By moving the crane pulley, the lower end of the yoke is moved towards the end location of the longitudinal slots for the horizontal working position. When the assembly is lifted, the other end of the yoke slips definitively into the new end location as a result of the assembly tipping under its own weight.

The device according to the invention enables changes between the vertical and horizontal working positions to be obtained without any additional mechanical supporting or moving components. The end locations are in planes which intersect the center of gravity of the composite assembly made up of the tool and the frame structure. All that is required to change the working positions is a non-precision movement of the yoke to the desired end location within the longitudinally extending slots. When the device is raised, the end locations are safely assumed through the inherent weight of the manipulating device.

The guiding pin constitutes a shaft at the lower end of the carrying yoke, from which the support frame structure is suspended in the end locations.

Each of the elongated slots can be configured to have two linear segments joined at a predetermined point whereat they are joined to define the apex of an obtuse angle so that the segments have respective slopes that are unequal whereby the movement of said yoke between said end locations is facilitated. Thus, if the segments with respectively different slopes are chosen so that the longitudinal slots are bent towards the end locations, the slots will require a shorter length than would be necessary if they had a uniform slope throughout. In addition, the above-mentioned apex or discontinuity in linearity between two segments of the slots with respectively different slopes provides an indication for the operator as to when to commence raising the crane.

BRIEF DESCRIPTION OF THE DRAWING

Two embodiments of the invention will be explained with reference to the accompanying drawing wherein.

DESCRIPTION OF THE PREFERRED EMBODIMENTS OF THE INVENTION

A conventional impact wrench 11 is fixed in a remotely-controlled manipulating device 13. An extension 15 is placed on the wrench 11 and, at its free end, carries a wrench socket 16 for positively engaging threaded bolts.

Figure 2:
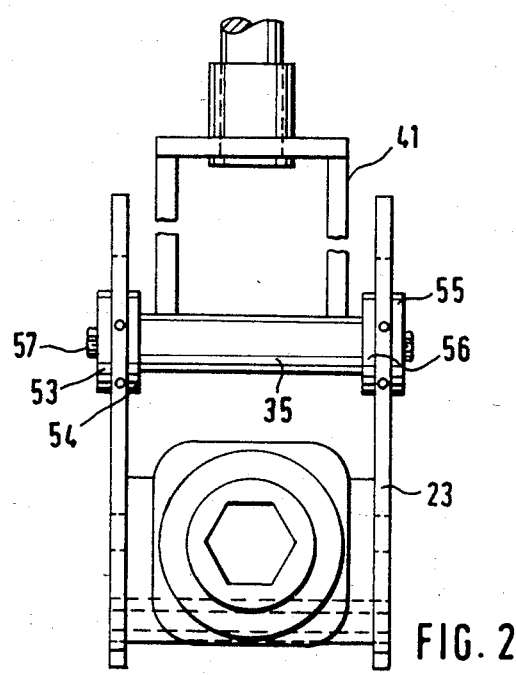
FIG. 2 is a front elevation view of FIG. 1.
Figure 3:
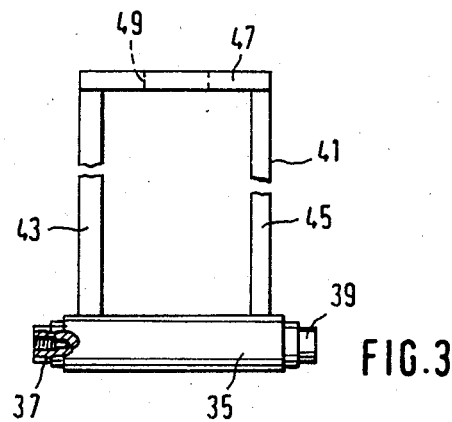
FIG. 3 is a front view of the displaceable carrying yoke.

The manipulating device 13 includes a frame structure 17 and a suspension means 21. The frame structure 17 includes two plate-like side pieces 23, screwed laterally onto the impact wrench 11. The side pieces 23 are interconnected at the front end by a transverse strut 25 secured thereto with threaded fasteners. A further transverse strut 27 joining the side pieces 23 is mounted at the rear end of the support structure 17. The transverse strut 25 is not shown in FIG. 2 in order to provide clarity.

The side pieces 23 include longitudinal slots 29 which interconnect the two end locations 31 and 33. The end location 31 lies in a first reference plane passing through the center of gravity of the composite assembly made up of the tool 11 and support structure 17. The end location 33 lies in a second reference plane passing through the common center of gravity. The end location 31 for holding the assembly in the horizontal position is at the front part of the side pieces 23 in the upper portion thereof; whereas, the end location 33 for holding the assembly in the vertical position is in the rearward part of the support structure 17. The longitudinal slots 29 are inclined with respect to the longitudinal axis of the tool and extend to the end position 33. The slots 29 include two segments 30, 32 having respectively different slopes. The segment 32 adjacent the vertical end location 33 has a steeper slope with respect to the longitudinal axis of the tool than the segment 30 adjacent the horizontal end location 31. The longitudinal slots 29 each have a corner 34 which shortens the length of slots 29 and thus permits the side pieces 23 to be shorter.

A guiding pin 35 is displaceably mounted in the longitudinally extending slots 29 at its two turned ends 37 and 39, and is welded to the lower end of a carrying yoke 41. The legs 43 and 45 of the yoke 41 carry a transverse strut 47 at their upper ends. The strut 47 has a through bore 49 in the center thereof. A threaded bolt 51 is arranged in the bore 49 and secured to the transverse strut 47 by an internally threaded sleeve 52. The manipulating device 13 is fastened to a flange (not shown) of the crane pulley by means of the threaded bolt 51.

The guiding pin 35 has two sets of supporting washers, (53, 54) and (55, 56), mounted at respective ends thereof. A side piece 23 is disposed between the washers of each set. This enables the pin 35 to be guided in the slots 29. The outer washers 53 and 55 are each pulled against respective end faces of the guiding pin 35 by threaded bolts 57 arranged on the longitudinal axis of the guiding pin.

The manipulating device according to the invention operates as described below.

Figure 1:
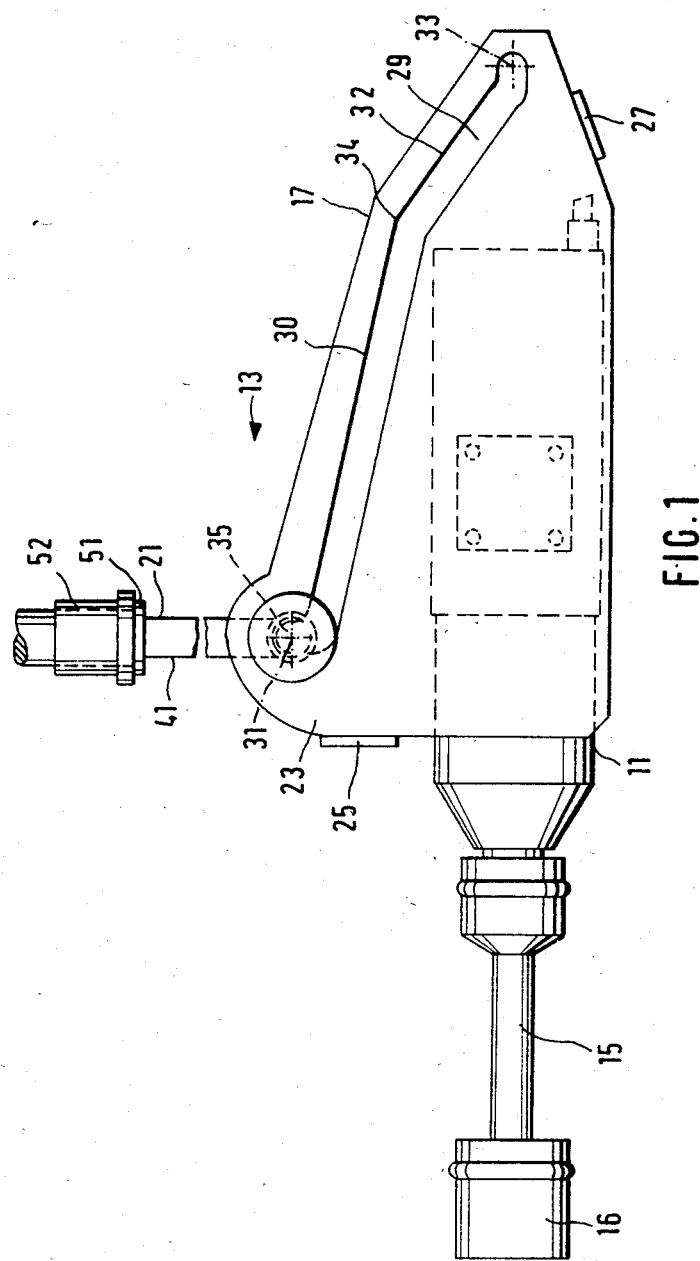
FIG. 1 is a side elevation view of a manipulating device according to the invention with a tool located in the horizontal working position.
Figure 4:
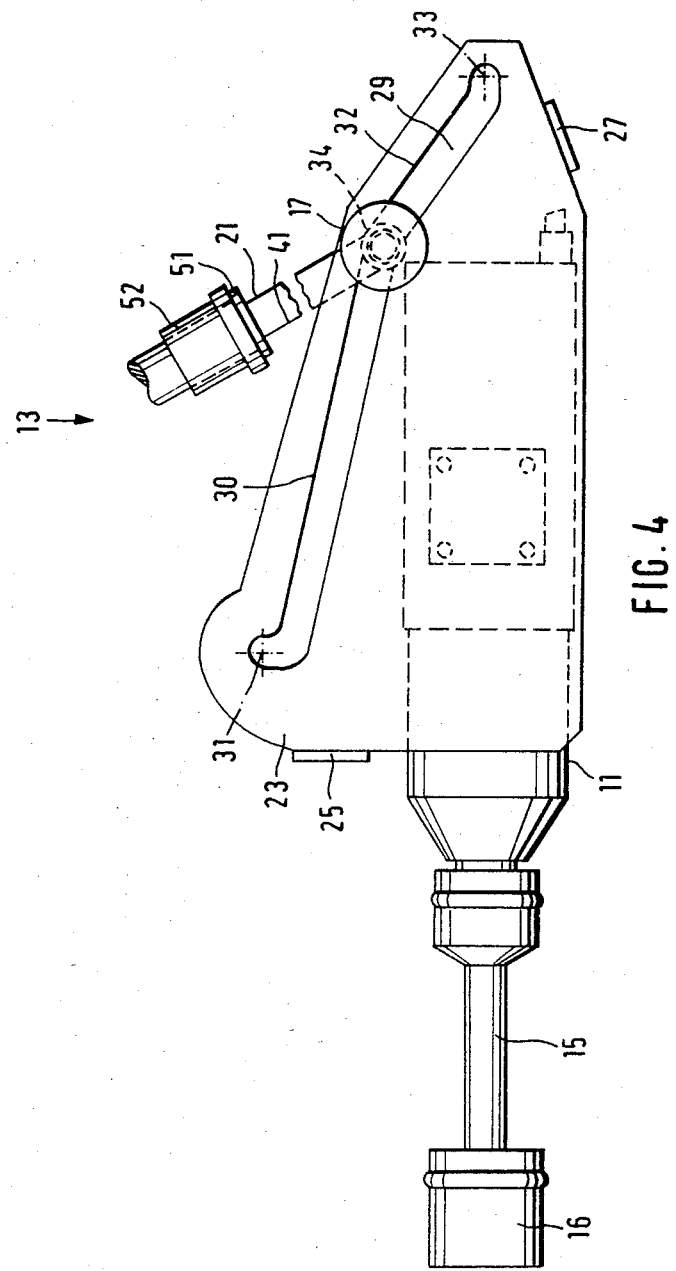
FIG. 4 shows the transitional position of the carrying yoke during a change to the vertical working position.
Figure 5:
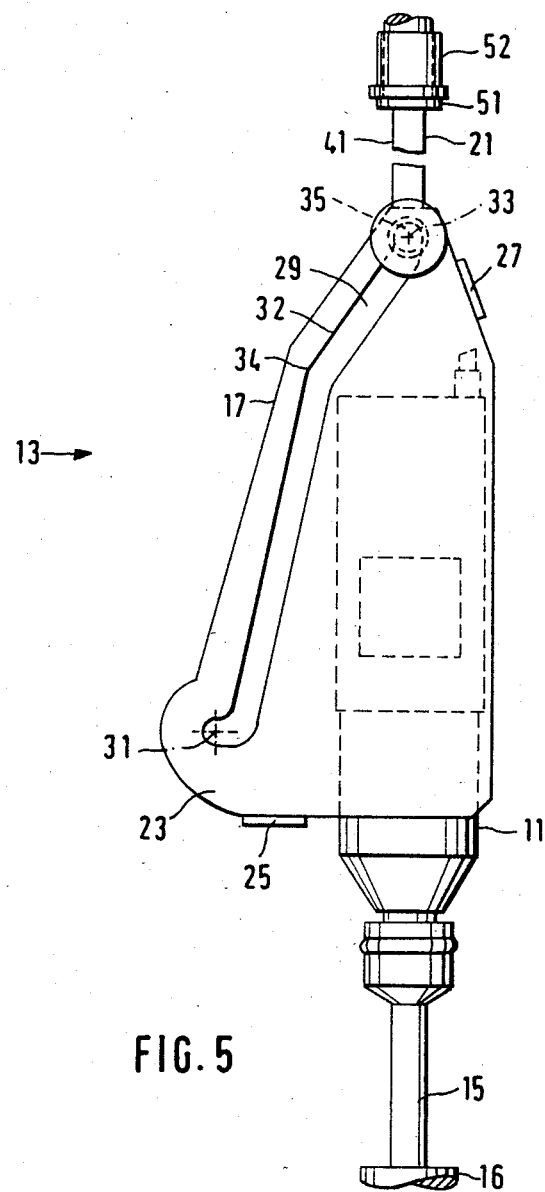
FIG. 5 shows the manipulating device after the composite assembly has been moved into the vertical working position; and, FIG. 6 is a side elevation view of another embodiment of the manipulating device of the invention equipped with an additional guide for engaging the carrying yoke to stabilize the composite assembly against unwanted dangling movement when the tool is in the horizontal working position.

In FIG. 1, the manipulating device 13 is shown in the horizontal working position. If a change has to be made from the horizontal to the vertical working position, the apparatus 13 is set down on a surface by means of the crane or power manipulator, and the load hook is moved down. The carrying yoke 41 with hook engaged is thereby shifted in the direction of the vertical end location 33 (FIG. 4). When the guiding pin 35 has passed the corner 34 in the longitudinal slots 29, the yoke 41 is raised by a lifting movement of the crane. The manipulating device 13 is raised with it, so that the guiding pin 35 of the yoke 41 slides into the vertical end location 33. The handling and manipulating device 13 is now in the vertical working position (FIG. 5).

The change from the vertical to the horizontal working position takes place as now described below.

The manipulating device 13 is put down on a surface on the tip of the wrench socket 16 by the crane or power manipulator and the load hook with the yoke 41 hooked therein is shifted in the direction of the horizontal end location 31. When the guiding pin 35 has passed the corner 34 in the longitudinal slots 29, the yoke 41 is lifted again by a movement of the crane. The handling and manipulating device 13 is lifted with it, so that the guiding pin 35 of the yoke 41 slips into the horizontal end position 31 by virtue of the inherent weight of the device 13. The support structure 17, which tips in the process, is now in the horizontal working position.

Figure 6:
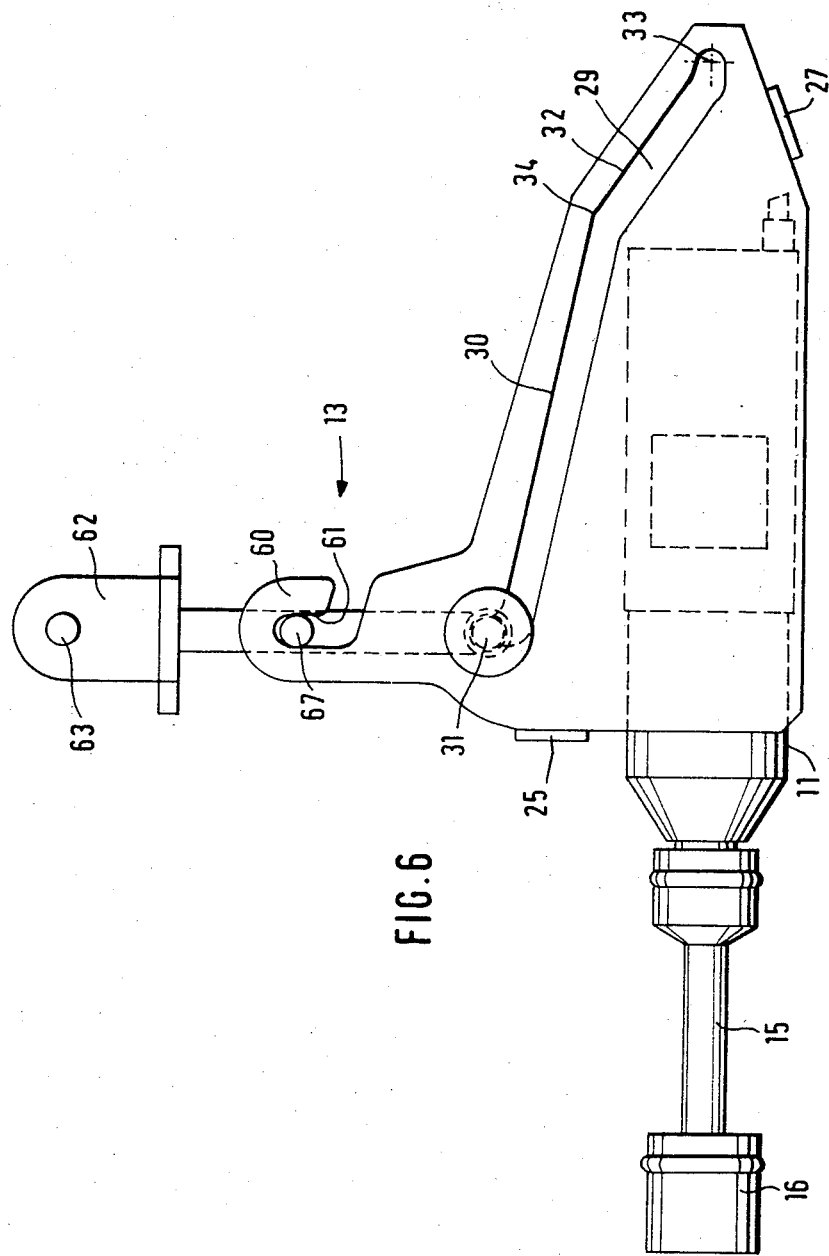

FIG. 6 shows a modified embodiment of the handling and manipulating device 13. This embodiment is provided with a hook-like extension 60 extending upwardly above the horizontal end location 31. The hook-like extensions 60 are integral portions of the side plate pieces 23 and define detent guides 61 extending substantially vertically therein. The detent guides 61 open in a direction extending laterally and obliquely downwards, so that when the carrying yoke 41 moves into the horizontal end location 31, guiding rollers 67 arranged laterally on the legs 43, 45 of the yoke 41 can enter and engage in the guides 61. This minimizes the dangling movement of the handling and manipulating device 13 when in the horizontal working position. At its upper end, the carrying yoke 41 has a rod 63 arranged transversely between two vertical plates 62. The load hook of the crane engages the yoke below this rod 63.

It is understood that the foregoing description is that of the preferred embodiments of the invention and that various changes and modifications may be made thereto without departing from the spirit and scope of the invention as defined in the appended claim.

What is claimed is:

1. A device for performing remotely-controlled work with a power tool such as an impact wrench or the like, the device being supported from support means such as the loading hook of a crane pulley or a power-driven manipulator or the like, the device comprising:

a frame structure including two side plates fixedly mounted to the power tool, said frame structure and said power tool conjointly defining a composite assembly having a common center of gravity;

guide means formed in each of said plates and connecting a first end location to a second end location, said first end location lying in a first reference plane passing through said common center of gravity and said second end location lying in a second reference plane also passing through said common center of gravity and being perpendicular to said first reference plane; and, a yoke suspended from said support means and slidably and pivotally engaging said guide means so as to permit movement of said yoke between said first end location whereat said composite assembly is suspensively held in midair only at said first end location so as to cause the tool to be in a horizontal operating position and said second end location whereat said composite assembly is suspensively held in midair only at said second end location so as to cause the tool to be in a vertical operating position.

2. The device of claim 1, each of said guide means being an elongated slot formed in the side plate corresponding thereto, said elongated slots being mutually adjacent and said plates being mutually parallel; said yoke having a guide pin mounted thereon, said guide pin having two ends adapted to slidably engage respective ones of said slots.

3. The device of claim 2, each of said elongated slots having two linear segments joined at a predetermined point whereat they define the apex of an obtuse angle so that said segments have respective slopes that are unequal whereby the movement of said yoke between said end locations is facilitated.

4. The device of claim 1, said yoke having guide means formed thereon; and, each of said side plates having a substantially vertical extension formed thereon above said first end location thereof, said extensions having receiving means formed therein for receiving said guide means when the tool is in said horizontal operating position whereby said composite assembly is stabilized to minimize dangling movements thereof.

5. A device for performing remotely-controlled work with a tool such as an impact wrench or the like, the device being supported from support means such as the loading hook of a crane pulley or a power-driven manipulator or the like, the device comprising;

frame means for fixedly carrying the tool, said frame means and said tool conjointly defining a composite assembly having a common center of gravity; and, suspension means for suspending said composite assembly from the support means, said suspension means including:

elongated guide means formed in said frame means and connecting a first end location to a second end location, said first end location lying on a first reference line passing through said center of gravity and said second end location lying on a second reference line also passing through said center of gravity and being transverse to said first reference line; and, carrying means connected to said support means and slideably and pivotally engaging said guide means so as to permit movement of said carrying means between said first end location whereat said carrying means suspensively holds said composite assembly in midair so as to cause the tool to be in a first predetermined operating position relative to said reference lines and said second end location whereat said carrying means suspensively holds said composite assembly in midair so as to cause the tool to be in a second predetermined operating position relative to said reference lines.

* * * * *